(12) United States Patent  (10) Patent No.: US 8,622,376 B2
Lavigne  (45) Date of Patent: Jan. 7, 2014

(54) VIBRATION ISOLATOR

(76) Inventor: Normand R. Lavigne, Manchester, NH (US)

(*) Notice: Subject to any disclaimer, the term of this patent is extended or adjusted under 35 U.S.C. 154(b) by 233 days.

(21) Appl. No.: 12/974,005

(22) Filed: Dec. 21, 2010

(65) Prior Publication Data

US 2011/0175267 A1  Jul. 21, 2011

Related U.S. Application Data

(60) Provisional application No. 61/296,092, filed on Jan. 19, 2010.

(51) Int. Cl.
*F16F 1/36* (2006.01)

(52) U.S. Cl.
USPC .......................................... 267/153; 267/219

(58) Field of Classification Search
USPC ............. 267/219, 153, 141, 140.3, 140, 292, 267/293
See application file for complete search history.

(56) References Cited

U.S. PATENT DOCUMENTS

| | | | | |
|---|---|---|---|---|
| 2,893,722 | A * | 7/1959 | Beck | 267/153 |
| 3,350,042 | A * | 10/1967 | Stewart et al. | 267/141.4 |
| 3,756,551 | A * | 9/1973 | Bishop | 267/141.1 |
| 4,066,058 | A | 1/1978 | Anderkay | |
| 4,522,378 | A | 6/1985 | Nelson | |
| 4,534,545 | A * | 8/1985 | Fannin et al. | 267/64.24 |
| 5,165,687 | A | 11/1992 | Soong | |
| 5,238,233 | A * | 8/1993 | Hein | 267/153 |
| 5,304,037 | A | 4/1994 | Scofiled | |
| 5,310,276 | A * | 5/1994 | Bergers et al. | 403/349 |
| 5,765,819 | A | 6/1998 | Hummel | |
| 5,791,637 | A * | 8/1998 | Reichelt et al. | 267/141 |
| 6,115,259 | A | 9/2000 | Karner | |
| 6,227,784 | B1 | 5/2001 | Antoine et al. | |
| 6,354,558 | B1 * | 3/2002 | Li | 248/615 |
| 7,284,748 | B2 | 10/2007 | Mishima | |
| 7,712,730 | B2 * | 5/2010 | Fabrizio | 267/152 |
| 8,152,146 | B2 * | 4/2012 | Rodecker | 267/141.4 |

FOREIGN PATENT DOCUMENTS

| | | |
|---|---|---|
| JP | 59-215195 | 12/1984 |
| JP | 09-120727 | 5/1997 |
| JP | 09-258407 | 10/1997 |
| JP | 10-234123 | 9/1998 |
| JP | 11-247811 | 9/1999 |
| JP | 2009-210062 | 9/2009 |

* cited by examiner

*Primary Examiner* — Melanie Torres Williams
(74) *Attorney, Agent, or Firm* — Robert R. Deleault, Esq.; Mesmer & Deleault, PLLC

(57) ABSTRACT

A vibration isolator for insertion into a support structure opening includes a first isolator body having a first body portion at a first body end and a first isolator wall extending from the first body portion toward a second body end. The first body portion has a larger perimeter than the second body end and defines a first fastener opening and the second body end defines a second fastener opening. The second fastener opening has a perimeter greater than the perimeter of the first fastener opening. The first body portion has a perimeter that is at least three times greater than the perimeter of the first fastener opening and at least two times greater than the perimeter of the support structure opening.

12 Claims, 5 Drawing Sheets

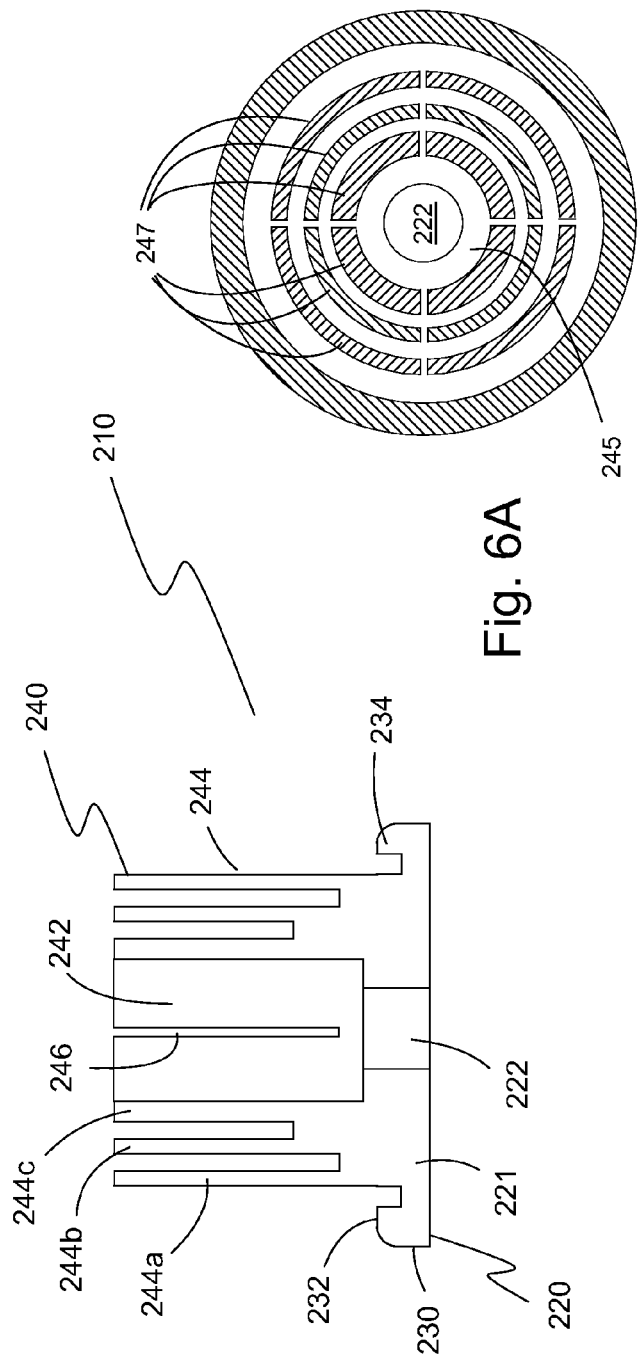
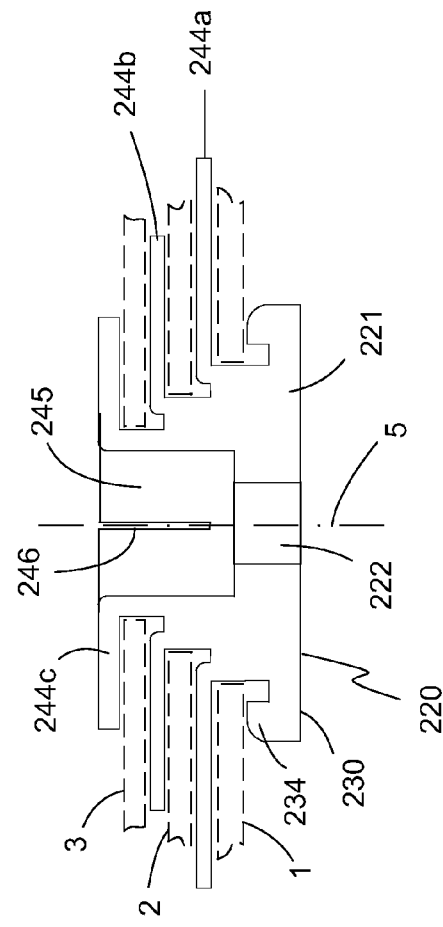
Fig. 6
Fig. 6A
Fig. 7

VIBRATION ISOLATOR

This application claims the benefit of U.S. Provisional Patent Application No. 61/296,092, filed Jan. 19, 2010.

BACKGROUND OF THE INVENTION

1. Field of the Invention

The present invention relates generally to vibration isolators. Particularly, the present invention relates to grommet-type vibration isolators.

2. Description of the Prior Art

All walkways, platforms, panel connection points, and the like that are subject to vibration have problems with the junctions of these structures and their supporting components/structures. The junctions are typically fastened together using bolts and the like. Vibration, however, is an insidious, external influence that over time causes the supported structure to fail structurally (i.e. to break requiring replacement) at the bolted junction and the supporting structure.

Attempts have been made to alleviate premature breaking at the bolted junction by incorporating one piece isolators, grommets and the like. Unfortunately, these attempted fixes did not solve the breaking problems since these one piece isolators, grommets and the like were also breaking down due to the vibration moving between the supporting components/structures and the walkways, platforms and/or panels. In addition, the typical one piece isolators or grommets were relatively small compared to the bolt size and the hole in the walkway, platform or panel.

To overcome these issues, two piece isolators or grommets were designed. Although these seemed to work by extending the time between repairs, the two piece isolators or grommets also failed over time. In addition, two piece isolators or grommets required two hands to install. Sometimes the walkways, platforms, panels, etc. are hard to access and/or they are on the sides of tanks and rail cars, which pose a hazard to workmen.

Additionally, electronic circuit boards in automotive aftermarket pumping systems also have vibration problems. Many of these boards are stacked one on top of another without the use of any vibration isolators to isolate the vibration caused by the pumping system. The pumping vibration gives rise to premature electronic circuit board failures.

Therefore, what is needed is vibration isolator that overcomes the shortcomings of previous vibration isolators.

SUMMARY OF THE INVENTION

It is an object of the present invention to provide a vibration isolator for supported structures such as walkways, platforms, panels, electronic circuit boards, and any panel-like assembly that is subject of premature failure at their mounting junctions with their support structures caused by vibration.

For a vibration isolator to really work, the vibration isolator needs to "float" the supported structure or keep it from grounding to the supporting structure such as a bracket from which the main vibration emanates. For example, the vibration in tanks emanates from the pumps used to pump the fluids in the tanks. Many times, the wind can make a supported structure vibrate, which causes vibrations to move back into the supporting structure, which also causes similar failure problems at the junctions between the supporting structure and the supported structure.

The present invention achieves these and other objectives by providing a vibration isolator having either a one-piece or multi-piece body with an opening therethrough, a first body end and a second body end where the first body end has a perimeter that is larger than the second body end. In one embodiment, a vibration isolator for insertion into a support structure opening includes a first isolator body having a first body portion at a first body end and a first isolator wall extending from the first body portion toward a second body end. The first body portion has a larger perimeter than the second body end and defines a first fastener opening. The second body end defines a second fastener opening having a perimeter greater than the perimeter of the first fastener opening. The first body portion has a perimeter that is at least three times greater than the perimeter of the first fastener opening and at least two times greater than the perimeter of the support structure opening.

The isolator body is made of a material selected from the group consisting of a thermoplastic and a thermoset. The material has an elongation in the range of about 200% to about 800%, a tear strength in the range of about 2000 N/mm to about 20,000 N/mm, a compression property of less than 50%, and a hardness of Shore 40A to Shore 90D. When the material is a foamed material, the material preferably has a density of about 350 Kg/m$^3$ to about 800 Kg/m$^3$.

In another embodiment of the present invention, the first isolator wall has a plurality of slits that extend from the second body end a predefined distance toward the first body portion defining a plurality of isolator wall portions enabling deflection of each of the plurality of isolator wall portions laterally from the second fastener opening.

In a further embodiment of the present invention, there is included a second isolator wall that extends from the periphery of the first body portion toward the second body end and being shorter than the first isolator wall.

In still another embodiment of the present invention, the first isolator wall further includes a plurality of concentric wall portions wherein each of the plurality of concentric wall portions are spaced a predefined distance from adjacent concentric wall portions.

In yet another embodiment of the present invention, there is included a second isolator body having a second body portion wherein the second isolator body has an identical structure to the first isolator body and a flexible interconnector connecting the first body portion to the second body portion.

Any of the embodiments of the present invention may be formed to have any cross-sectional shape to fit the opening of the support structure such as, for example, circular, square, rectangular, triangular, octagonal, and the like and still provide all the advantages of the present invention.

BRIEF DESCRIPTION OF THE DRAWINGS

FIG. 6 is a cross-sectional view of another embodiment of the present invention showing a vibration isolator with a second end having a plurality of concentric wall portions.

FIG. 6A is a top view of the embodiment in FIG. 6 showing the plurality of concentric wall portions.

FIG. 7 is a cross-sectional view of the embodiment shown in FIG. 6 showing the vibration isolator mounted to first, second and third supported structures.

DETAILED DESCRIPTION OF THE PREFERRED EMBODIMENT

Figure 1:
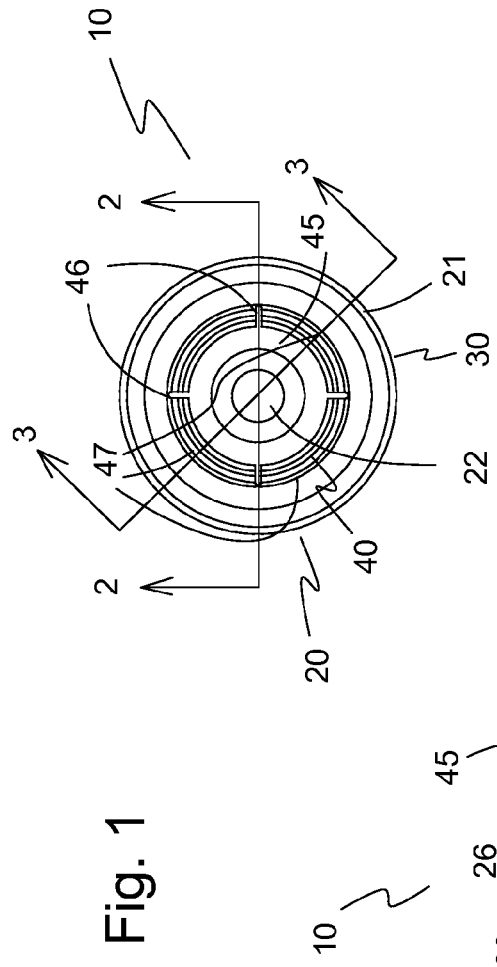
FIG. 1 is a top view of one embodiment of the present invention showing a one-piece vibration isolator.

The preferred embodiment(s) of the present invention is illustrated in FIGS. 1-13. In one embodiment shown in FIGS. 1-3, a vibration isolator 10 includes a one-piece, first isolator body 20 having a first body portion 21 at a first body end 30 and a first isolator wall 44 that extends from the first body portion 21 toward a second body end 40. First body portion 21 has a larger perimeter than second body end 40. First body portion 21 defines a first fastener opening 22 therethrough and the second body end 40 defines a second fastener opening 45 that communicates with first fastener opening 22 forming a continuous passageway through first isolator body 20 for receiving a fastener such as, for example, a bolt, rivet and the like. The perimeter of second fastener opening 45 is greater than the perimeter of first fastener opening 22.

First body portion 21 forms a first body end surface 32 that extends laterally from an outside surface 26 of first isolator wall 44. Second body end 40 has with a plurality of slits 46 that extend from second body end 40 toward first body portion 21 a predefined distance forming a plurality of isolator wall portions 47. The plurality of isolator wall portions 47 appear like a plurality of "petals" or "leaves" that are laterally deflected outwardly from the longitudinal axis 5 of first fastener opening 22 when in use. The plurality of slits 46 extend from second body end 40 towards first body end 30 a predefined distance and allows the isolator wall portions 47 defined by the plurality of slits 46 to fold outward and away from the longitudinal axis 5 of first fastener opening 22. This is better illustrated in FIGS. 7-10.

Second body end 40 is sized to fit through an opening such as a bolt opening in a supported structure where first body end surface 32 contacts the surface of the supported structure that surrounds the bolt opening. First body end 30 contacts the surface of the supporting structure surrounding the bolt opening in the supporting structure. The plurality of isolator wall portions 47 are folded outwardly against the opposite surface of the supported structure that surrounds the bolt opening. This is accomplished by either physically folding the plurality of isolator wall portions 47 prior to insertion of the fastening hardware or are forcibly folded by the supported structure when the hardware is attached and tightened.

Figure 2:
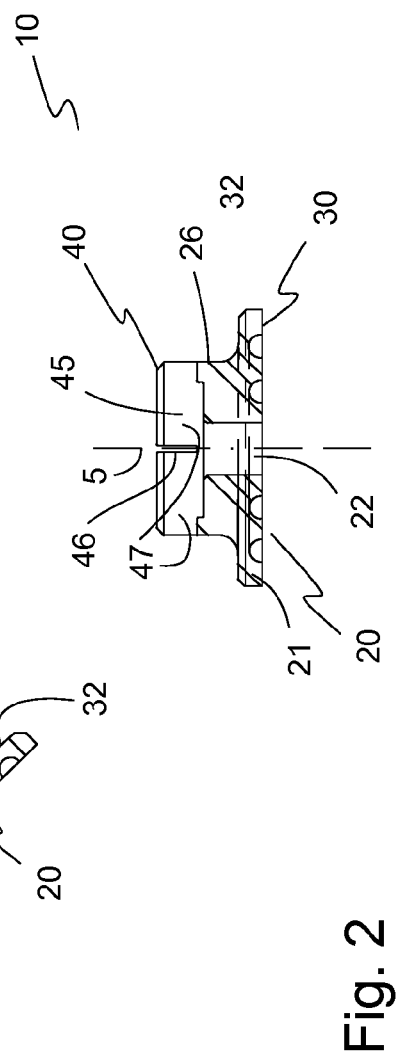
FIG. 2 is a cross-sectional view of the embodiment in FIG. 1 taken along line 2-2.
Figure 3:
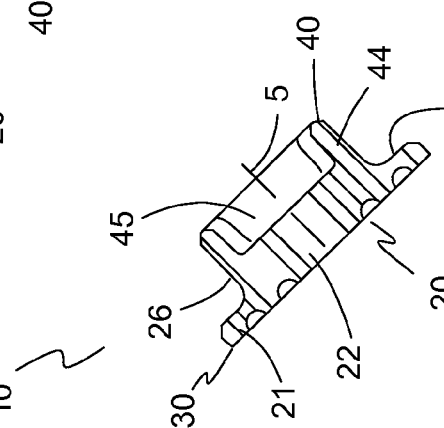
FIG. 3 is a cross-sectional view of the embodiment in FIG. 1 taken along line 3-3.
Figure 4:
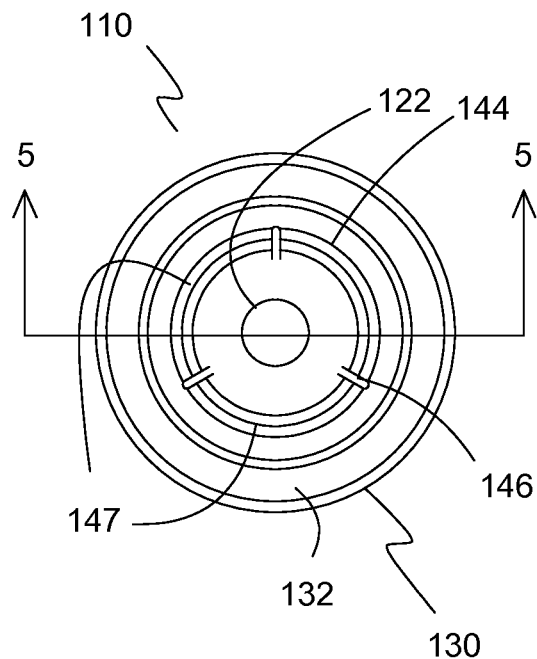
FIG. 4 a top view of another embodiment of the present invention showing a one-piece vibration isolator.
Figure 5:
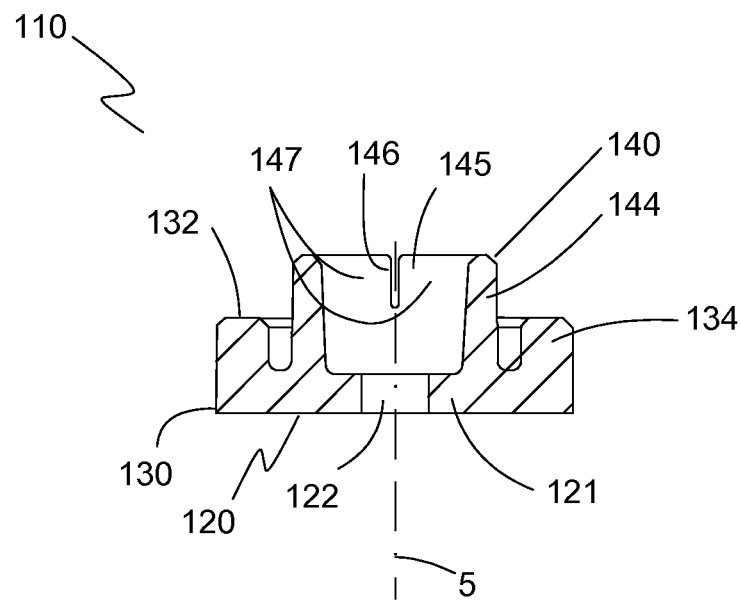
FIG. 5 is a cross-sectional view of the embodiment in FIG. 4 taken along line 5-5.
Figure 8A:
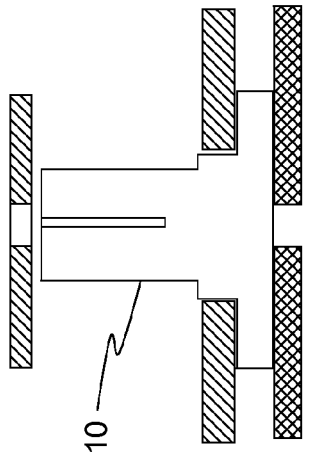
FIGS. 8A-B, 9A-B and 10A-B are cross-sectional views of other embodiments of the present invention showing examples of coupling various shapes of the support structures.
Figure 9A:
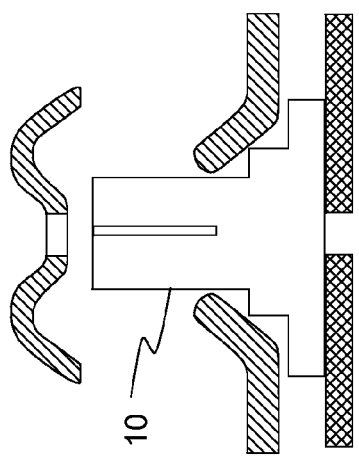
Figure 10A:
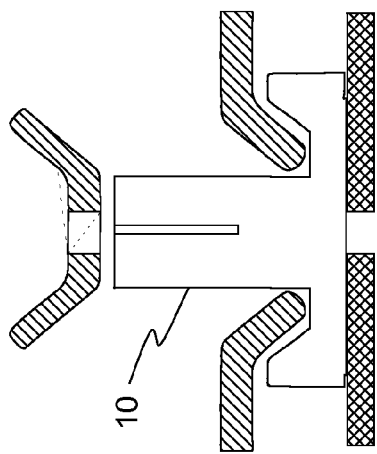
Figure 8B:
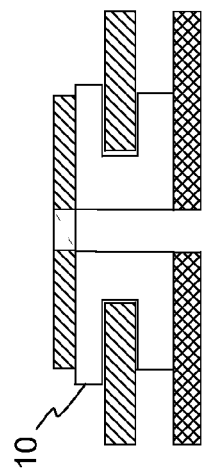
Figure 9B:
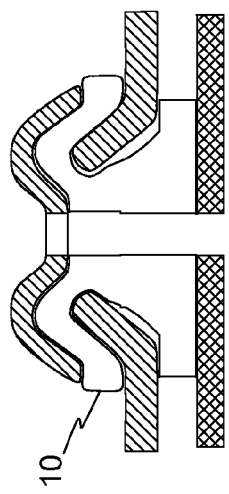
Figure 10B:
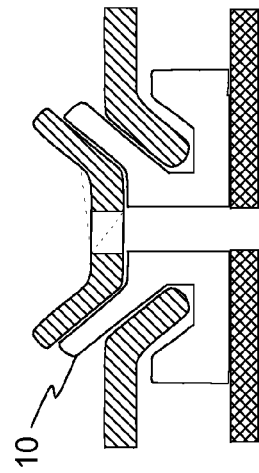

In another embodiment shown in FIGS. 4-5, a vibration isolator 110 includes a one piece, first isolator body 120 having a first body portion 121 at a first body end 130 and a first isolator wall 144 that extends from the first body portion 121 toward a second body end 140. First body portion 121 has a larger perimeter than second body end 140. First body portion 121 defines a first fastener opening 122 therethrough and the second body end 140 defines a second fastener opening 145 that communicates with first fastener opening 122 forming a continuous passageway through first isolator body 120 for receiving a fastener such as, for example, a bolt, rivet and the like. The perimeter of second fastener opening 145, like the embodiment in FIGS. 1-3 is greater than the perimeter of first fastener opening 122. First body end 130 includes a second isolator wall 134 that extends from the periphery of first body portion 121 concentrically along the longitudinal axis 5 of first fastener opening 122 a predefined distance defining a first body end surface 132. First isolator wall 144 extends concentrically along the longitudinal axis 5 of first fastener opening 122 a predefined distance from first body portion 121 in the same direction as and spaced a predefined distance from second isolator wall 134 between first fastener opening 122 and second isolator wall 134. First isolator wall 144 spatially extends a predefined distance beyond first body end surface 132 and includes a plurality of slits 146 forming a plurality of isolator wall portions 147. The plurality of isolator wall portions 147 appear like a plurality of "petals" or "leaves" that are laterally deflected outwardly from the longitudinal axis 5 of first fastener opening 122 when in use. The plurality of slits 146 extend from second body end 140 towards first body end 130 a predefined distance and allows the isolator wall portions 147 defined by the plurality of slits 146 to fold outward and away from the longitudinal axis 5 of first fastener opening 122.

Second body end 140 is sized to fit through a bolt opening in a supported structure where first body end surface 132 contacts the surface of the supported structure that surrounds the bolt opening. First fastener opening 122 is aligned with a bolt opening in a supporting structure (not shown) where first body end 130 contacts the surface of the supporting structure surrounding the bolt opening in the supporting structure. First body end has a surface 131 that is substantially perpendicular to longitudinal axis 5 and contacts the base support structure to which the supported structure is being connected. The plurality of isolator wall portions 147 of second body end 140 are folded outwardly against the opposite surface of the supported structure that surrounds the bolt opening. As disclosed for FIGS. 1-3, this is accomplished by either physically folding each of the plurality of isolator wall portions 147 prior to insertion of the fastening hardware or the plurality of isolator wall portions 147 are forcibly folded by the supported structure when the hardware is attached and tightened. Additionally, when the fastening hardware is tightened, second isolator wall 134 of first body end 130 is squeezed and flattened between the supported structure and the base supporting structure providing a larger vibration isolation area supporting the supported structure than provided by previous vibration isolators.

Turning now to FIGS. 6-7, there is illustrated another embodiment of the one-piece vibration isolator of the present invention for isolating a plurality of layered supported structures connected to a base supporting structure (not shown). A vibration isolator 210 includes a one piece, unitary, isolator body 220 having a first body portion 221 at a first body end 230 and a first isolator wall 244 that extends from first body portion 221 toward a second body end 240 a predefined distance. As with prior disclosed embodiments, first body portion 221 has a larger perimeter than second body end 240. First body portion 221 defines a first fastener opening 222 therethrough and the second body end 240 defines a second fastener opening 245 that communicates with first fastener opening 222 forming a continuous passageway through first isolator body 220 for receiving a fastener such as, for example, a bolt, rivet and the like. The perimeter of second fastener opening 245, like the previously disclosed embodiments, is greater than the perimeter of first fastener opening 222. First body end 230 includes a second isolator wall 234 that extends from the periphery of first body portion 221 concentrically along the longitudinal axis 5 of first fastener opening 222 a predefined distance defining a first body end surface 232. First isolator wall 244 extends concentrically along the longitudinal axis 5 of first fastener opening 222 a predefined distance from first body portion 221 in the same direction as and spaced from second isolator wall 234 between first fastener opening 222 and second isolator wall 234. First isolator wall 244 extends beyond first body end surface 232 and includes a plurality of concentric wall portions 244a, 244b and 244c. Each of the plurality of concentric wall portions 244a, 244b and 244c include a plurality of slits 246 that defines a plurality of isolator wall portions 247. This is best seen in FIG. 6A. First isolator wall 244 has a second fastener opening 245 that has perimeter greater than the perimeter of first fastener opening 222 and communicates with first fastener opening 222. The plurality of slits 246 of each of the concentric wall portions 244a, 244b and 244c allows the isolator wall portions 247 of isolator wall 244 defined by the plurality of slits 246 to fold outward and away from the longitudinal axis 5 of first fastener opening 222. Each of the plurality of concentric isolator wall portions 244a, 244b and 244c are used with first, second and third panels 1-3, respectively, as clearly shown in FIG. 7.

Second body end 240 is sized to fit through a bolt opening in a supported structure where first body end surface 232 contacts the surface of the first supported structure 1 that surrounds the bolt opening. First body end 230 contacts the surface of the supporting structure (not shown) surrounding the bolt opening in the supporting structure. Isolator wall portions 247 of concentric wall portion 244a of second body end 240 are folded outwardly against the opposite surface of the first supported structure 1 that surrounds the bolt opening. This is accomplished by either physically folding each of the associated plurality of isolator wall portions 247 prior to insertion of the fastening hardware or the plurality of isolator wall portions 247 are forcibly folded when the hardware is attached and tightened. The bolt opening of the second supported structure 2 is then assembled to second body end 240 such that concentric wall portions 244b and 244c are inserted through the bolt opening of the second supported structure 2. In a similar fashion as the assembly of the first supported structure 1, the second wall portions 247 of concentric wall portion 244b of second body end 240 are folded outwardly against the opposite surface of second supported structure 2 that surrounds the bolt opening. If a third supported structure 3 is to be attached, the bolt opening of the third supported structure 3 is then assembled to second body end 240 such that concentric wall portion 244c is inserted through the bolt opening of the third supported structure 3. Isolator wall portions 247 of concentric wall portion 244c are folded outwardly against the opposite surface of third supported structure 3 that surrounds the bolt opening. Additionally, when the fastening hardware is tightened, first body end surface 232 is squeezed and flattened between the first supported structure 1 and the base supporting structure (not shown) providing a larger vibration isolation area than provided by previous vibration isolators. Simultaneously, concentric wall portions 244a, 244b and 244c are likewise squeezed and flattened between first supported structure 1, second supported structure 2, and third supported structure 3, which is flatted between the opposite surfaces of second and third supported structures 2, 3, respectively, by the fastening hardware. This provides the advantage of a larger isolation footprint between each supported structure, thus, enhancing the vibration isolation characteristics of the vibration isolator 210. FIG. 7 illustrates a cross-sectional view of vibration isolator 210 mounting first supported structure 1, second supported structure 2 and third supported structure 3 to a base supporting structure (not shown).

The slits are important to form the "petals" or "leaves" that provide the advantage of allowing the tubular material to bend instead of stretch, which occurs when the slits are not included. Without the slits, the vibration isolator of the present invention was useful on fastener openings that had smaller diameters but would begin to fail as the fastener openings became larger. In fact, the tubular shape of the folding end actually ripped. By segmenting the tubular shape with the slits, the tubular wall segments would simply bend providing additional advantages where the material maintained the proper thickness by not being stretched.

FIGS. 8A-B, 9A-B and 10A-B are other illustrative examples of the vibration isolator of the present invention used with planar, upturned and downturned mounting structures.

Figure 12:
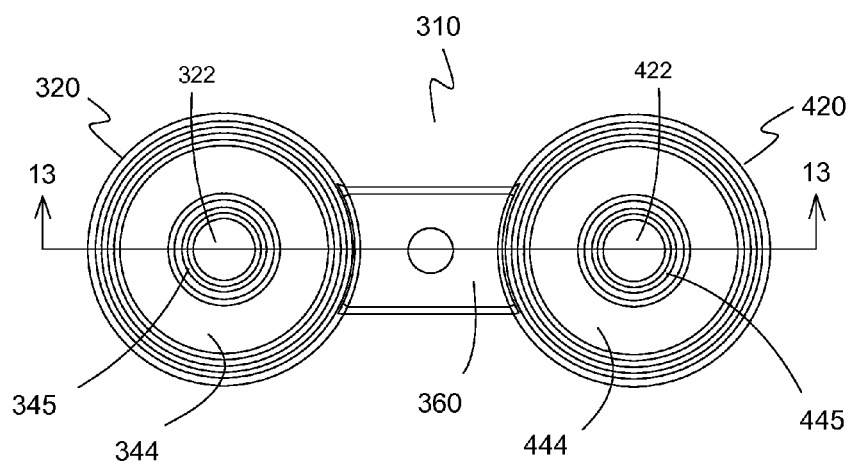
FIG. 12 is a top view of the embodiment in FIG. 11.
Figure 13:
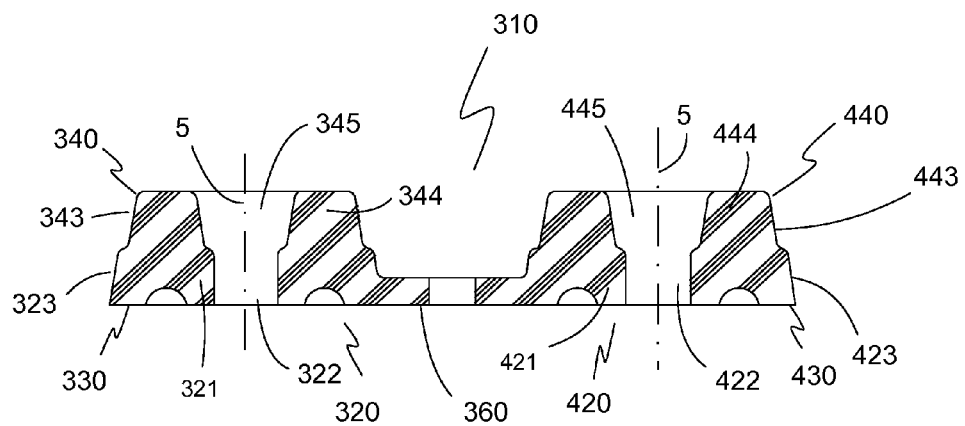
FIG. 13 is a cross-sectional view of the embodiment in FIG. 12 taken along line 13-13.
Figure 11:
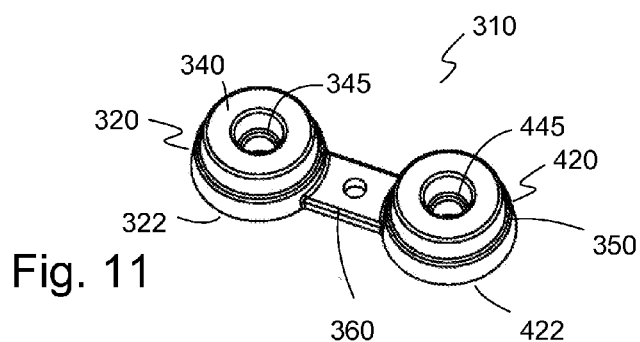
FIG. 11 is a perspective view of another embodiment of the present invention showing a one-piece vibration isolator having a first body portion and a second body portion with a flexible interconnecting structure.

Turning now to FIGS. 11-13, there is illustrated another embodiment of the present invention showing a one-piece vibration isolator 310. Vibration isolator 310 includes a first isolator body 320, a second isolator body 420 and a flexible interconnector 360 connecting first isolator body 320 to second isolator body 420. First isolator body 320 has a first body portion 321 at a first body end 330 and a first isolator wall 344 that extends from the first body portion 321 toward a second body end 340. First body portion 321 has a larger perimeter than second body end 340. First body portion 321 defines a first fastener opening 322 therethrough and the second body end 340 defines a second fastener opening 345 that communicates with first fastener opening 322 forming a continuous passageway through first isolator body 320 for receiving a fastener such as, for example, a bolt, rivet and the like. The perimeter of second fastener opening 345 is greater than the perimeter of first fastener opening 322. Isolator wall 344 has an outside surface 343 that is recessed from an outside surface 323 of the perimeter of first body portion 321. In other words, outside surface 343 has a smaller perimeter that outside surface 323. Likewise, second body portion 420 has a first body portion 421 at a first body end 430 and a first isolator wall 444 that extends from the first body portion 421 toward a second body end 440. First body portion 421 has a larger perimeter than second body end 440. First body portion 421 defines a first fastener opening 422 therethrough and the second body end 440 defines a second fastener opening 445 that communicates with first fastener opening 422 forming a continuous passageway through first isolator body 420 for receiving a fastener such as, for example, a bolt, rivet and the like. The perimeter of second fastener opening 445 is greater than the perimeter of first fastener opening 422. Isolator wall 444 has an outside surface 443 that is recessed from (i.e. smaller perimeter than) an outside surface 423 of the perimeter of first body portion 421. Vibration isolator 310 may be used by folding vibration isolator 310 at flexible interconnector 360 so that either first body ends 320, 420 or second body ends 330, 430 are opposed to each other, depending on the application.

There are several important characteristics of the vibration isolator for all embodiments of the present invention. These important characteristics are the first body portion (21) must have a perimeter that is at least three times greater than the perimeter of first fastener opening (22) and at least two times greater than the perimeter of the support structure opening in which vibration isolator (10) is used. Preferably, first body portion (21) has a perimeter that is at least five times greater than the perimeter of first fastener opening (22).

In all of the embodiments, flexible, compressible materials are recommended such as silicone, rubber, certain thermoplastics, etc. The preferred material is a thermoplastic or a thermoset. More preferably, the material is a polyurethane and, most preferably, a microcellular polyurethane.

The material used for the vibration isolator of the present invention must have certain characteristics to provide the advantages taught by the present invention. These characteristics include having an elongation in the range of about 200% to about 800%, a tear strength in the range of about 2000 N/mm to about 20,000 N/mm, a compression property of less than 50%, and a hardness of Shore 40A to Shore 90D. When the material used is a foamed or microcellular material, the material must have a density of about 350 Kg/m$^3$ to about 800 Kg/m$^3$. When the material is a thermoset aromatic foamed urethane, the material preferably has a density of about 500 Kg/m$^3$, elongation of about 400% to about 500%, tensile strength of about 14,000 N/mm, and a maximum compression property of about 7%.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A vibration isolator for insertion into a support structure opening wherein the vibration isolator is a unitary structure made of a single material and having a first body portion at a first body end and a first isolator wall extending from the first body portion toward a second body end wherein the first body portion has a larger perimeter than the second body end, the first body portion defining a first fastener opening and the second body end defining a second fastener opening having a perimeter greater than the perimeter of the first fastener opening wherein the first body portion has a perimeter that is at least three times greater than the perimeter of the first fastener opening and at least two times greater than the perimeter of the support structure opening.

2. The vibration isolator of claim 1 wherein the first body portion has a perimeter that is at least five times greater than the perimeter of the first fastener opening.

3. The vibration isolator of claim 1 wherein the vibration isolator is made of a material selected from the group consisting of a thermoplastic and a thermoset.

4. The vibration isolator of claim 1 wherein the vibration isolator is made of a material having an elongation in the range of about 200% to about 800%, a tear strength in the range of about 2000 N/mm to about 20,000 N/mm, a compression property of less than 50%, and a hardness of Shore 40A to Shore 90D.

5. The vibration isolator of claim 4 wherein the material has a density of about 350 Kg/m$^3$ to about 800 Kg/m$^3$ when the material is a foamed material.

6. The vibration isolator of claim 1 wherein the vibration isolator is made of a thermoset aromatic urethane foamed to a density of about 500 Kg/m3, elongation of about 400% to about 500%, tensile strength of about 14,000 N/mm, and a maximum compression property of about 7%.

7. The vibration isolator of claim 1 wherein the first isolator wall has a plurality of slits that extend from the second body end a predefined distance toward the first body portion defining a plurality of isolator wall portions enabling deflection of each of the plurality of isolator wall portions laterally from the second fastener opening.

8. The vibration isolator of claim 1 further comprising a second isolator wall that extends from the periphery of the first body portion toward the second body end and being shorter than the first isolator wall.

9. The vibration isolator of claim 7 wherein the first isolator wall further includes a plurality of concentric wall portions wherein each of the plurality of concentric wall portions are spaced a predefined distance from adjacent concentric wall portions.

10. The vibration isolator of claim 1 further comprising:
    a second isolator body having a second body portion wherein the second isolator body has an identical structure to the vibration isolator; and
    a flexible interconnector connecting the first body portion to the second body portion enabling the first body ends or the second body ends to be in direct, opposed contact with each other.

11. The vibration isolator of claim 10 wherein the flexible interconnector has a length that permits mirror-image alignment of the vibration isolator to the second isolator body.

12. The vibration isolator of claim 10 wherein the vibration isolator, the second isolator body and the flexible interconnector together are a one piece, unitary structure.

* * * * *